United States Patent [19]
Kopp

[11] Patent Number: 5,842,013
[45] Date of Patent: Nov. 24, 1998

[54] ARCHITECTURE FOR MODULAR COMPUTER SYSTEM IN WHICH ONE OF THE MODULES IS DEDICATED TO USER-INTERFACE TASK

[76] Inventor: Martin Kopp, Frankenstrasse 34, D-68259, Mannheim, Germany

[21] Appl. No.: 596,127
[22] PCT Filed: Jul. 22, 1994
[86] PCT No.: PCT/DE94/00848
  § 371 Date: Feb. 8, 1996
  § 102(e) Date: Feb. 8, 1996
[87] PCT Pub. No.: WO95/04973
  PCT Pub. Date: Feb. 16, 1995

[30] Foreign Application Priority Data

Aug. 9, 1993 [DE] Germany .......................... 43 26 740.8

[51] Int. Cl.⁶ .................................................. G06F 9/00
[52] U.S. Cl. ........................................... 395/670; 395/672
[58] Field of Search .............................. 395/200–49, 306, 395/670, 672; 364/222.2, 228.2, 228.3, 225

[56] References Cited

U.S. PATENT DOCUMENTS

| | | | |
|---|---|---|---|
| 4,570,220 | 2/1986 | Tetrick et al. | 395/306 |
| 5,179,660 | 1/1993 | Devany et al. | 395/200.49 |

FOREIGN PATENT DOCUMENTS

| | | |
|---|---|---|
| 0107263 | 5/1984 | European Pat. Off. |
| 0283628 | 9/1988 | European Pat. Off. |
| 0 350 911 | 1/1990 | European Pat. Off. |
| 0352080 | 1/1990 | European Pat. Off. |
| 0 401 803 | 12/1990 | European Pat. Off. |
| 0528396 | 2/1993 | European Pat. Off. |
| 0 205 101 | 9/1993 | European Pat. Off. |
| 0 413 044 | 11/1994 | European Pat. Off. |

OTHER PUBLICATIONS

Siemens–Katalog MP 29, "Prozeβleitsystem TELEPERM M", Aug. 1983.
Enslow, Jr., "Multiprocessors and Parallel Processing", 1974, pp. 328 th 335.
M. Conner: "Boards speed Windows and vie as standards". In: EDN Electrical Design News, Oct. 10, 1991, Newton, MA, US, pp. 97–102.

*Primary Examiner*—Majid A. Banankhan
*Attorney, Agent, or Firm*—Spencer & Frank

[57] ABSTRACT

Very large amounts of data may be handled by the user interface of computers. The main processor is thus permanently overloaded, so that the computing power available for the actual application is sharply reduced in a manner that cannot be predicted without limiting the user requests. A new computer architecture is disclosed which allows a higher and more exactly predictable computing power to be achieved. In order to make the rest of the system independent from the user interface, the computer is subdivided in such a way that a first module (part 1) takes over the display and operation tasks of the user interface, a second module (part 2) takes over the processing of the application programs without their user interface, and a third module (part 3) takes over the remaining functional units. All modules have their own internal data paths. An interface between the first and second modules support the exchange of messages and data without affecting the independent processes in the first and second modules. The first and second modules have their own access paths to common devices located in the third module.

23 Claims, 3 Drawing Sheets

ARCHITECTURE FOR MODULAR COMPUTER SYSTEM IN WHICH ONE OF THE MODULES IS DEDICATED TO USER-INTERFACE TASK

BACKGROUND OF THE INVENTION

Large amounts of data are handled by the user interface of computers. Data take up a considerable quantity of the computer's throughout, because on one hand the resolution of imaging systems is increasing constantly and new applications such as animation and desktop video require high data transfer rates for structured or unstructured graphics, and on the other hand, with the constantly growing complexity of operating structures, shorter response times are being demanded from inter-active systems.

It is an established fact that not only the main processor in the computer but also, if necessary, additional passive or active components are used in order to generate the presentations made accessible to a human being by the imaging system (see: Foley, van Dam, Feiner, Hughes, "Computer Graphics, Principles, and Practice", 2nd edition, Addison-Wesley Publishing Company, Reading, Mass., ISBN 0-201-12110-7, and in the following especially EP 0350911 A2 for a service processor).

Present-day systems do not take account in their structures of the extreme demands that have to be met in order to achieve the operational functionality of the user interface, nor the huge quantities of data that have to be imported from or exported to a point outside the graphics sub-system and the main processor in a very short time, e.g. from a mass storage device or an input/output interface. For instance, the image memory of a system that strives to attain a resolution of 1600×1200 pixels with a colour depth of 32 bits per pixel will take up about 7.5 MB. For an animation sequence running at 25 images per second, some 187 MB/second of new data will have to be imported into this memory to recreate the image displayed. If an image repeat rate of 100 Hz is the aim, however, 750 MB/s have to be read from this memory and displayed simultaneously.

This leads a severe overloading of the part of the computer installation that is supposed to be working on an actual application, meaning calculating and retaining the data and so forth. The performance of this part of the computer is severely affected both by the heavy load placed on its data paths for transporting the data to and from the graphics sub-system, which can cause a blockage of the main processor or other subordinate units (see also EP 0350911 A2 as an example of a multi-processor system in which the shared main memory of this close-coupled multi-processor system is described as the principle 'bottleneck'), and,by the frequent interruptions suffered by the working procedure for the purpose of reacting instantly to an input from the user or for maintaining the actuality of the presentation. Moreover, with these kinds of architecture it is not possible to forecast their performance without limiting the availability of the system for user queries (see EP 0350911 A2, if the system support processor is occupied with handling interrupts, semaphores, etc.).

SUMMARY OF THE INVENTION

The present invention is thus based on the task of reducing the load on the parts of the computer handling the actual application caused by implementing the user interface for presentation and function, thereby in order to achieve more efficient computers with which, even if their familiar components are retained and even despite ever more stringent demands on the quality of the user interface, it will be possible greatly to increase the capacity available for the application and to achieve a good level of predictability.

According to the method of the invention the present solution consists of the architecture for a computer with a user interface along the lines of claim 1, characterised by:

a) the components of the computer being divided into three parts in such a way that one of them, Part 1 (101), mainly takes over the function of providing the user interface in presentation and function; another, Part 2 (102), mainly operates the application programs divorced from their user interface and the operating programs needed for it; and the third, Part 3, takes charge of the remaining components (107, 108, 109, 110) of the computer; the parts not necessarily being physically separated from one another, as it is preferable to strive for a single unit of equipment, b) Parts 1, 2, and 3 possessing their own separate data paths for their internal tasks, c) a software and hardware interface (103) existing between Part 1 (101) and Part 2 (102), which supports the exchange of messages and data without creating a direct, permanent connection which affects the independent running of the processes in Parts 1 and 2, d) Part 1 and Part 2 each having their own access path (105, 106) to jointly used additional components in Part 3.

With regard to the additional features of the invention, reference is made to the sub-claims.

The advantages attainable with this invention consist mainly of the effects described in the following summary:

The separation (see claims 1a and 1b) of Part 1, which handles the user interface, from Part 2, which handles the actual application (for instance: making calculations, administering data, or making logical combinations), leads to the clear uncoupling of these areas and thus to a far more efficient computer. For instance, a change of context by the processor, as is customary with present-day architecture, can in many cases be avoided completely.

Parts 1 and 2 can be optimized much more effectively for their actual tasks (see claims 2, 3, 5, 6, and 7) than is possible with any system in which both tasks are handled by one and the same part, for instance, a single processing unit consisting of a processor, a memory, and an input/output.

Part 1's and Part 2's own access paths to the shared components in Part 3 (see claims 1a, 1d, 2, 3, 5, 8, and 9) increase the potential performance of the system, because for instance, while Part 1 is making use of its access to a component in Part 3 (e.g. in order to load animation data from a mass storage device or a network), Part 2 can continue to work without interruption on its local data paths (see claims 1b, 1c, 3, and 7). In the customary system, this kind of access either has to be handled by the central processor itself, for instance, by reading data from the mass storage device and passing it on to the graphics card, or at least a bus system in the central processor has to be used which then more or less blocks it.

If the invention is implemented with suitable synchronisation equipment for access by Parts 1 and 2 to the jointly used-components in Part 3 (see claims 1d, 8, and 9), it can be guaranteed that even if maximum throughput is being fully utilized, the part that has the highest priority at any given moment will have access with only a minimum delay. Any necessary synchronisation can, for instance, be provided via the software and hardware interface between Parts 1 and 2 (see claims 1c and 4) or by a connection between the components in Parts 1 and 2 responsible for access (see claims 8 and 9).

The structural unification of the part of a computer responsible for the presentation and that responsible for the operational functionality of the user interface (see: claim 1a) permits extensive optimization such as would not be possible if these components were separated. In the customary architectures today, although the presentation is admittedly accelerated by it's own processors, handling the response to the user (meaning the functionality of the user interface) still always has to be the responsibility of the central processor, which therefore has to interrupt whatever calculations are being carried out and thus has to stop them for the necessary length of time. For instance, the object oriented structure of modern user interfaces can be better represented with the new architecture as described in claim 1 on the computer's architecture because any object of the user interface will generally consist of presentation and function, which are handled here by one and the same unit (see claims 1a, 1b, 2, and 6).

Data retention becomes easier because it is possible to do, at precisely that place where the graphic presentation is being made, the correlation of a co-ordination point on the screen surface (meaning, for instance, the position of a pointer) to the individual objects or structures of the user interface (see claims 1a, 1b, 2, and 6). For instance, the calculation of the mutual covers of such objects now only has to be done once.

The structure that is defined by the architecture in the computer is similar to the client/server software structure of modern operating system/user interface combinations. A division with message exchange and data transfer is provided here as well (see claims 1c and 4). This will facilitate a particularly simple adaptation of such systems to the new architecture. Older systems can likewise be transformed by appropriate measures (see claim 1c), for instance by the provision of a multiple-access or dual ported memory.

Unlike genuine client/server structures, as are to be found for instance in so-called X-terminals, all the advantages are retained in this architecture of decentralized hardware with its own computing capacity for applications (see claims 5, 6, and 7). Moreover, and in contrast to the possibilities described in Patent EP 401803 and elsewhere (the combination of several separate computer units), it is also possible to make use of techniques which are only feasible when the connections are kept short, meaning when they are all inside the one computer (see claims 1a, 1c, 4, 8, and 9).

A distinguishing feature of the architecture is a clear modularisation, even if in actual practice it may not be visible in a physical or spatial form (see claims 1a, 1b, 1c, 1d, and 10), and this makes it simple to exchange parts in order to modify or increase the output or to use various different processors (see claims 2, 3, 6, and 7) or components in the three parts.

It is easy to see that the advantages of modularization listed here and the similarity of this architecture to modern operating systems makes it possible to use this architecture independently of the design of the part-components, and that this makes it suitable for use with all known systems with a number of different processors and different operating system/user interface combinations (see claims 1a, 1c, 2, and 3).

BRIEF DESCRIPTION OF THE DRAWINGS

The following text will now describe three possible examples of the implementation of the invention in practice, with reference to the drawing, in which.

Figure 1:
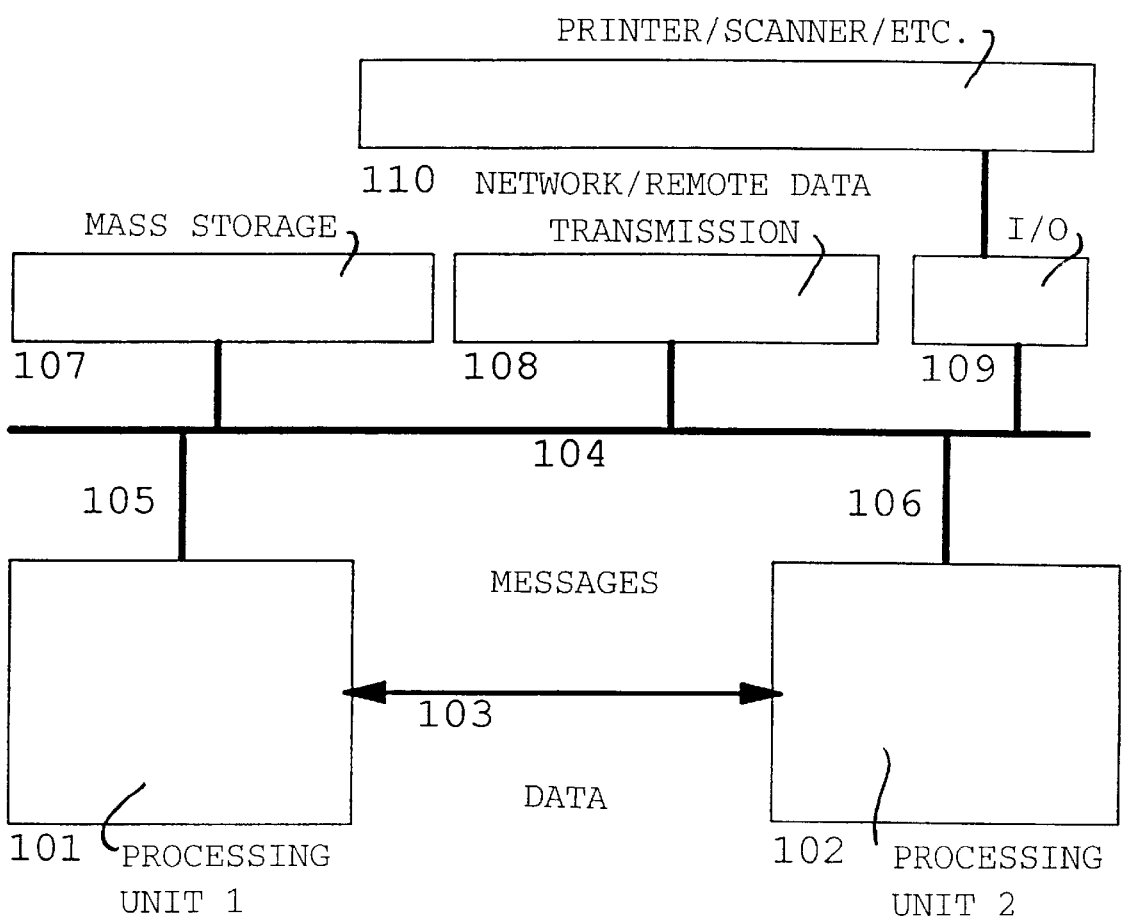
FIG. 1 schematically shows an example of the architecture of a computer.

The abbreviations used in the drawings are explained in the text.

DETAILED DESCRIPTION OF THE PREFERRED EMBODIMENT(S)

There now follows an explanation of the invention on the basis of the drawings of three implementation examples in terms of the construction and, where appropriate, of the way in which this invention works.

The details of the possible implementations such as special processors, bus systems, etc., are intended to serve only to communicate a better understanding of the present invention. It will be clear to the reader that the invention can be put into practice even without these special details. Schematic presentations are used in the drawings in order not to burden the invention with unnecessary details.

FIG. 1 shows a schematic example of the implementation of the architecture. A Processing Unit One 101 representing Part 1, which for instance could consist of a microprocessor with memory and peripheral interfaces (see claim 2), has an interface 103 for messages and data connecting it to another part, Processing Unit Two 102 likewise representing Part 2 (see claims 1a and 1c). The separated internal bus systems of the two processing units are not illustrated (see claim 1b).

Part 3 is shown in this example as the additional units 107 (mass storage), 108 (network or remote data transmission) and 109 (input/output control, I/O), the periphery bus connecting these components 104 and the external peripherals 110 (printer, scanner, etc.) connected to I/O 109 (see claim 1a).

Processing Unit One 101 is connected via its own access path 105 to the peripheral bus 104 in Part 3 (see claim 1d). Accordingly, Processing Unit Two 102 is connected with its own access path 106 to the peripheral bus 104 and thus to the jointly used components 107, 108, 109, and 110 in Part 3. The mutual terminal arrangements of the peripheral bus 104 by the Processing Units One 101 and Two 102 can be made, for instance, by a collision-detection process, similar to that used in the Ethernet.

The type of access to the individual components 107, 108, 109, and 110 using the peripheral bus 104, and the selection of the components, are shown only by way of an example and do not represent any inherent characteristics of the present invention. For instance, it would be equally possible to use a crossbar switch, which would permit the simultaneous access of the processing units representing Parts 1 and 2 to the components of Part 3 so long as the component groups it controlled were disjunctive.

Figure 2:
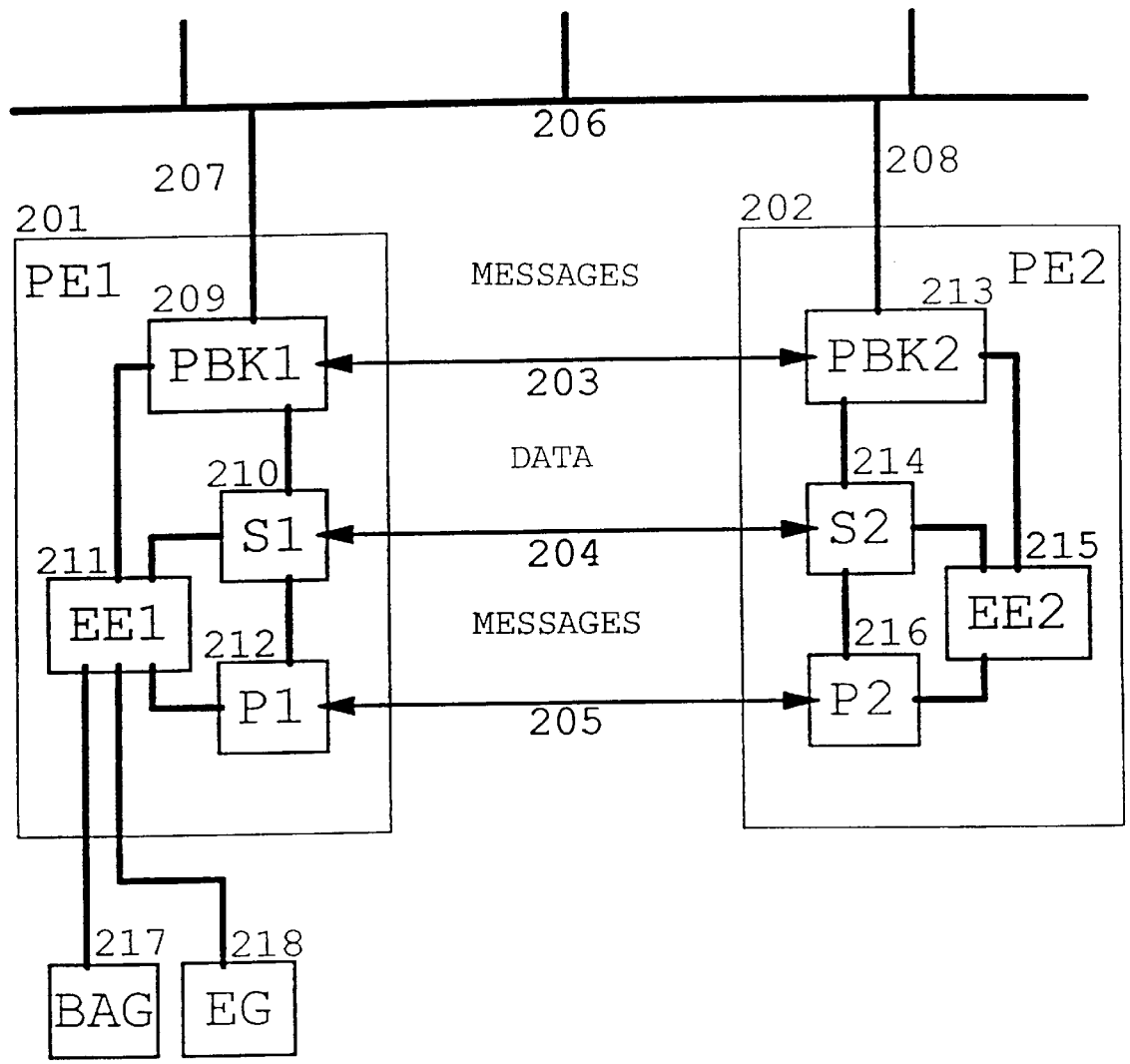
FIG. 2 illustrates possible designs of Parts 1 and 2.

The design of Processing Units One 101 and Two 102, which represent Parts 1 and 2 in claim 1, is likewise only an example. Another, more advanced, design is shown in FIG. 2. The processing units in this drawing are shown as 201 (Processing Unit One, PE1), and 202 (Processing Unit Two, PE2), as they merely represent a further possible design (see claims 1a, 2, 3, 6, and 7).

PE1 201 is connected via an access path of its own 207, which in this case could for instance be implemented in the form of an SCSI or an IEEE bus, with a peripheral bus 206 (see claim 1d). PE2 202 could, but need not necessarily, be connected in the same fashion via 208 to 206. Let an SCSI or an IEEE bus be assumed as the connecting equipment 209

(periphery bus control unit One, PBK1) and 213 (periphery bus control unit Two, PBK2). The connection 203 for message interchange between PBK1 and PBK2 is optional (see claims 8 and 9), but could for instance be made through an additional connection between the host adapters or by special protocols on the peripheral bus 206 or via a roundabout route via the access paths 204 for data or 205 for messages.

PBK1 209 is furthermore connected to 210 (memory One, S1), which would be feasible via a direct memory access (DMA) to memory S1, and to 211 (extension unit 1, EE1). EE1 211 (see claim 6) can, for instance, contain adapters for image output 217 (image output device BAG) or for the connection to input devices 218 (input device EG). Also, in addition to the connection with PBK1 209 already mentioned, it has one connection to S1 210 and another to processor 212 (processor One P1). The latter could be a microprocessor adapted for graphics. This has an additional internal connection inside PEI 201 with S1 210. This will make the internal, independent bus systems in PE1 201 representing Part 1 clear (see claim 1b).

The internal construction of PE2 202 is similar in all relevant respects. PBK2 213 is connected to S2 214 (memory Two, S2) and EE2 215 (extension unit 2, EE2), which in this example could consist of a mathematical co-processor (see claim 7). S2 214 has connections to PBK2 213, EE2 215, and the processor P2 216, which in turn has contact with EE2 215. P2 216 could be any suitable microprocessor. It emerges at this point that the present invention can be readily adapted to fit in with existing architectures by letting the old architecture take the place of Part 2 (in this case PE2 202) which is augmented in a suitable manner, for instance using one of the methods described here, by a Part 1 (in this case PE1 201) and connected to it. In this way, it should be possible to use components from the existing architecture, e.g. a graphics card in PE1 201.

Connection 204, for handling data between S1 210 and S2 214, could take the form of DMA transfer that may be initiated by processors P1 212 and P2 216. Connection 205, for handling messages, could take the form of interrupt lines by means of which the processors would inform one another of events which could if necessary be accompanied by a transfer on 204. Alternatively, queues could be implemented in hardware (as FIFO memories, for instance) (see claims 1c and 4).

If connections 203, 204, and 205 have been clearly defined, PE1 201 could also for instance be replaced if need be, even at a later date, by the variant PE1 301 shown in FIG. 3. The reverse also applies, of course, for any other implementation of PE2 202. This makes the possible modular concept visible (see claim 10).

Figure 3:
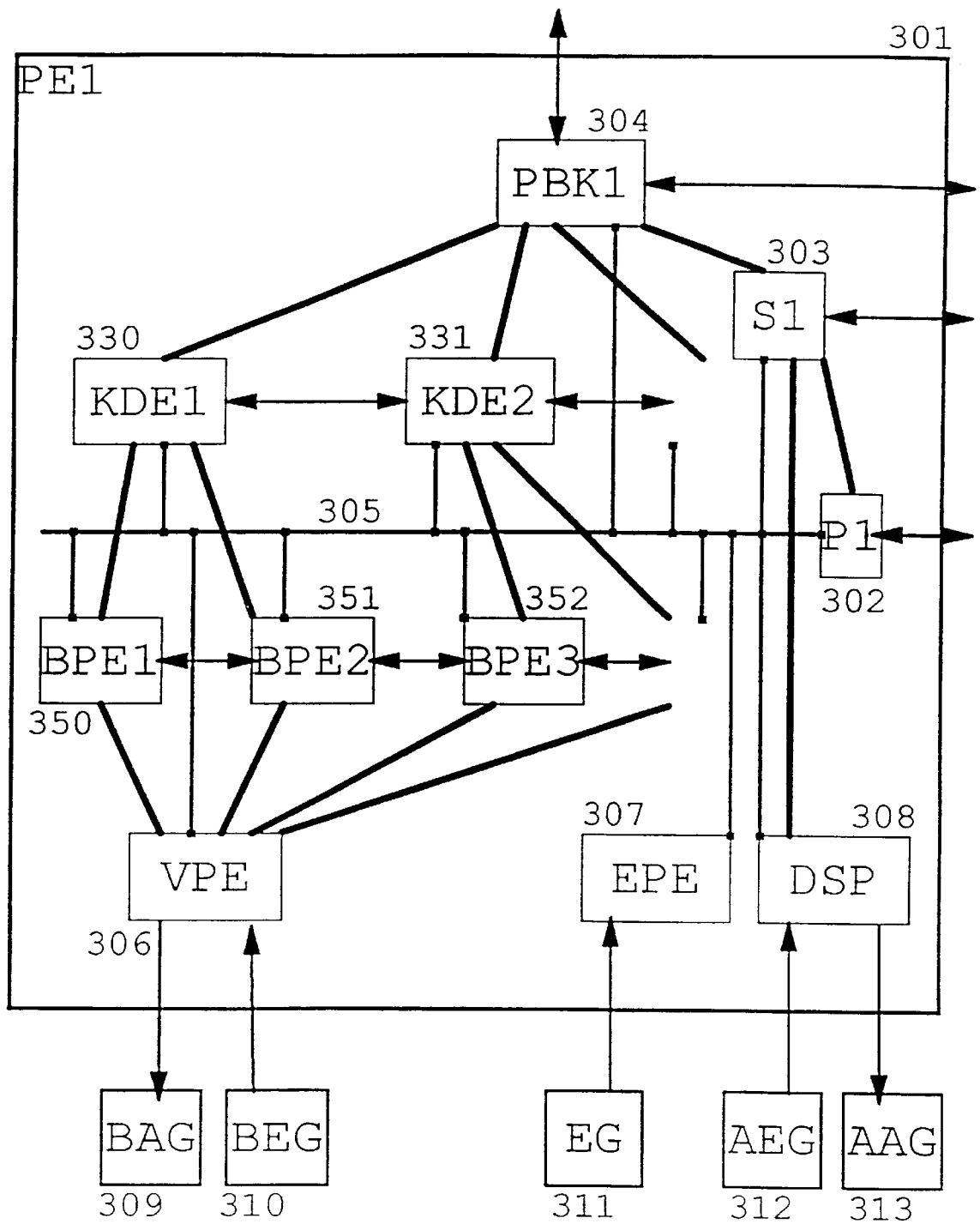
FIG. 3 illustrates possible design of Part 1.

PE1 301 as shown in FIG. 3 has the same basic structure as PE1 201. A correlation results, in respect of the basic function: P1 302 corresponds to P1 212, but in this case should instead be implemented as a universal processor because the graphics functions, as will be explained later, can be taken on by other components. It has a connection with S1 303, corresponding to S1 210, but can perhaps also have different key data. This in turn is connected to PBK1 304, which corresponds to PBK1 209. P1 302, S1 303, and PBK1 304 each has one or more than one connection to the remainder of PE1 301, which is the counterpart to EE1 211. Let the following components of EE1 211 be presented here in detail by way of examples: a digital signal processor (DSP) 308 connected to S1 303 and with interfaces to 312 (audio input device AEG) and 313 (audio output device AAG); an input processing unit EPE 307, which has an interface to one or more than one input devices EG 311; and a video processing unit (VPE) 306 which on the one hand has an interface connected to 309 (image output device BAG) and another connected to 310 (image input device BEG) but on the other hand also has access to a scalable number of image processing units (BPE1, BPE2, BPE3, ...) 350, 351, 352 ... The BPE's could take the form of small modules composed of a simple graphics processor, possibly combined with a BITBLT function, and a part of the image memory. They generate in parallel the presentation which is read from VPE 306 and issued as a video signal, or alternatively arrives as a video signal at VPE 306, where it is converted and distributed to the BPE's. The BPE's are connected, individually or in groups, with compression/decompression units (KDE1, KDE2, ...) 330, 331 ... which send data streams to and from PBK1 304 and the various different KDE's, converting them in whichever way is required.

PBK1 304 can of course, for instance, consist of a number of parallel access units in order to attain a greater bandwidth.

All these components are controlled by a configuration and message bus 305, through which the processor P1 302 coordinates everything. Interrupt signals and very small quantities of data, such as a single character of the keyboard, can also be transmitted via this bus (see claims 1a, 2, and 6).

The possible further access paths of their own which PE1 or PE2 might have to their own components in Part 3 have not been illustrated. These might for instance consist of a modem connected via an interface allocated exclusively to PE2, or something similar (see claim 5).

I claim:

1. An improved computer system with a user interface containing a number of processing units using separate internal bus systems, and equipment for tranferring data and messages, and software programs for a system-wide administration of the user interface, wherein the improvement comprises:

a) the hardware and software components of the computer system are divided into first, second and third modules, said first module providing the user interface a presentation and a function;
   said second module operates application programs and does not contain any of the operating programs and computer components needed for the user interface;
   said third module takes charge of remaining components including at least a mass storage through a connecting structure which is suitable for providing access to these components; and
   said three modules are implemented as a single unit of equipment apart from any external peripheral components;

b) said modules each possess their own data paths for handling internal tasks, which data paths are separate from those of the other modules;

c) a software and hardware interface exists in the unit of equipment between said first and second modules, which interface supports exchange of messages and data without creating a direct, permanent connection affecting independent running of processes in said first and second modules; and d) said first and second modules each has its own, direct connection path to jointly used additional components in said third module.

2. The computer system of claim 1, wherein said first module is implemented by at least a first processor with a first memory and a first access component, which first access component is connected to those components in said third module which are to be jointly used with said second module.

3. The computer system of claim 1, wherein said second module is implemented by at least a second processor with a second memory and a second access component, which second access component is connected to those components in said third module which are to be jointly used with said first module.

4. The computer system of claim 1, wherein the interface between said first module and said second module provides an efficient exchange of data and messages through a use of interrupt signals and queues.

5. The computer system of claim 1, wherein additional access paths are exclusively designated for said first module and said second module to connect to those components in said third module which are allocated exclusively to them.

6. The computer system of claim 1, wherein a first additional specific equipment within said first module supports any relevant functions, including accelerating a graphics assembly, and supporting various input/output devices, local mass storage and compression/decompression of data.

7. The computer system of claim 1, wherein a second additional specific equipment within said second module supports various functions, including accelerating mathematical functions, data retaining functions, phonetic search in complete texts, and local mass storage.

8. The computer system of claim 1, wherein a connection exists between a first and a second access components respectively in said first and second modules, which access components facilitate access to jointly used components in said third module, which connection handles a collision by priority control on any jointly used data paths.

9. The computer system of claim 8, wherein the connection is implemented in the form of priority control using dynamically changeable priorities, enabling priorities to be changed for said first module or said second module compared to a respective base configurations.

10. The computer system of claim 1, wherein said three modules are implemented as a modular design in which hardware and software interfaces are designed to support various different configurations and a retro-fitting facility to meet changing requirements.

11. A computer system, comprising:
   a first module having a first bus system and a first processing unit, the first module performing user-interface tasks;
   a second module located adjacent the first module, the second module having a second bus system and a second processing unit, the second module executing application programs but performing no user-interface tasks;
   an interface connecting the first module and the second module to transfer data and messages between the modules;
   a peripheral bus connecting the first module via a first access path and the second module via a second access path; and
   a third module having at least one additional unit that is connected to the peripheral bus, said at least one additional unit including a mass storage.

12. The computer system of claim 11, wherein the first module further comprises:
   a first memory and a first extension unit, the first memory and the first extension unit being connected to one another and to the first processing unit so as to form a loop; and
   a first peripheral bus control unit connected to the first memory, the first extension unit and the first access path.

13. The computer system of claim 11, wherein the second module further comprises:
   a second memory and a second extension unit, the second memory and the second extension unit being connected to one another and to the second processing unit so as to form a loop; and
   a second peripheral bus control unit connected to the second memory, the second extension unit and the second access path.

14. The computer system of claim 11, wherein the interface comprises a priority interface, a data interface and an interrupt interface.

15. The computer system of claim 14, wherein the priority interface is connected between the first peripheral bus control and the second peripheral bus control unit, the priority interface providing priority of accessing the third module by one of the first module and the second module.

16. The computer system of claim 15, wherein the priority interface provides dynamically changeable priorities depending on a base configuration of the first module and the second module.

17. The computer system of claim 11, wherein the at least one additional unit of the third module further comprises a network transmission unit connected to the peripheral bus and an input/output unit connected to the peripheral bus.

18. The computer system of claim 17, further comprising an accessory unit connected to the input/output unit.

19. The computer system of claim 11, wherein the interface connecting the first module and the second module comprises at least one interrupt line that is not part of the peripheral bus.

20. The computer system of claim 11, wherein the first module further comprises a first memory and second module further comprises a second memory, and wherein the interface connecting the first module and the second module comprises means for transferring data between the first and second modules by DMA transfer.

21. The computer system of claim 11, wherein the first module further comprises means for receiving input data and supplying output data without using the peripheral bus.

22. The computer system of claim 1, wherein the unit of equipment is itself modular in design.

23. The computer system of claim 1, wherein the remaining components of the third component further comprises a network/remote data transmission unit, an input/output interface, and an accessory unit.

* * * * *